United States Patent [19]

Spongr et al.

[11] 4,451,732
[45] May 29, 1984

[54] APPARATUS FOR MEASURING THICKNESS OF COATING ON CONTINUOUSLY MOVING MATERIAL

[75] Inventors: Jerry J. Spongr, Tonawanda; Byron E. Sawyer, N. Tonawanda, both of N.Y.

[73] Assignee: Twin City International, Inc., Amherst, N.Y.

[21] Appl. No.: 380,250

[22] Filed: May 20, 1982

[51] Int. Cl.³ ........................................... G01N 23/225
[52] U.S. Cl. .................................. 250/308; 250/359.1; 250/360.1
[58] Field of Search .................. 250/308, 360.1, 359.1, 250/358.1

[56] References Cited

U.S. PATENT DOCUMENTS

| | | | |
|---|---|---|---|
| 3,115,577 | 12/1963 | Joffe et al. | 250/308 |
| 3,125,680 | 3/1964 | Schlaechter | 378/55 |
| 3,132,248 | 5/1964 | Eggebraaten et al. | 250/308 |
| 3,529,158 | 9/1970 | Joffe et al. | 250/308 |
| 4,383,172 | 5/1983 | Holler et al. | 250/308 |

FOREIGN PATENT DOCUMENTS

| | | | |
|---|---|---|---|
| 1214910 | 4/1960 | France | 250/308 |
| 1084180 | 9/1967 | United Kingdom . | |
| 2008743 | 6/1979 | United Kingdom . | |

OTHER PUBLICATIONS

"Continuous Strip Monitor", UPA Technology, Inc. (brochure).
"Strip Monitor", *Materials Evaluation*, Sep. 1978, pp. 87–88, (Magazine Article).
"Betascope CC950 Cont", Fischer Instrumentation (brochure).

*Primary Examiner*—Janice A. Howell
*Assistant Examiner*—Constantine Hannaher
*Attorney, Agent, or Firm*—Christel, Bean & Linihan

[57] ABSTRACT

Apparatus using radiation techniques for measuring coating thickness on continuously moving strip material as it travels along a predetermined path and without altering that path. A shuttle carrying a measuring probe having a radioactive isotope source and a detection device is provided in the path of the strip for reciprocation along a preselected segment of the path. The shuttle and the probe are releasably engaged with the strip and carried thereby for synchronous movement therewith in the direction of travel of the strip during a measurement cycle, and are disengaged from the strip when no measurement is being made, the movement of the shuttle then being controlled by an independent drive mechanism. The shuttle includes a strip guide plate which is tiltable about an axis substantially parallel to the longitudinal axis of the strip in order to orient the surface having the coating so it can be properly presented to the measuring probe.

12 Claims, 9 Drawing Figures

APPARATUS FOR MEASURING THICKNESS OF COATING ON CONTINUOUSLY MOVING MATERIAL

BACKGROUND OF THE INVENTION

This invention relates generally to the measuring art, and more specifically to a system using radiation, such as beta radiation backscatter, for the automatic measurement of coating thicknesses on continuously moving strips, bands, and the like, wherein the thickness measurement is made without the necessity for changing the speed of the moving material.

The beta radiation backscatter basic concept of measuring the thickness of ultra thin coatings by the use of radiation is well known, and is disclosed in U.S. Pat. No. 3,132,248, among others. Various types of apparatus have been developed for implementing that measurement technique. Often a part having a coating the thickness of which is to be determined is placed on a measuring table which has an apertured support for the part so that the coated surface is in operative alignment with a radiation source and detector. See, for example, U.S. Pat. No. 3,115,577. Where it is either impractical or impossible to position the part on such a table, a portable measuring probe can be used, the portable probe being positioned either directly on the part or on a separate supporting surface. U.S. Pat. No. 3,529,158 shows one such type of portable probe.

Often it is desired to measure the coating thickness on a continuously moving strip or band of material, for example as the coated material comes from the coating apparatus. Such measurements made immediately after the application of the coating material permit appropriate adjustments to be made in the coating process or apparatus while the coated material is being produced, to provide the desired coating thickness with a minimum of wasted strip material. However, the measurement of moving materials present problems, and it is made more difficult when the strip of material being measured is of an interrupted nature, as for example a strip of spaced, interconnected semiconductor contacts. Different systems have been proposed to accomplish that measurement, but each has drawbacks which limit its usefulness.

In one such prior system the plated strip is guided onto a measuring wheel which rotates continuously with the strip. The wheel carries one or more measuring probes in operative contact with the strip coating on the wheel. This system has limitations because of wheel diameter size, speed of travel, and accurate positioning of the moving specimen relative to the probe(s).

In another such system, the measuring probe is stationary and positioned on one side of a slide block. The strip is moved across the opposite side of the block, being maintained in contact therewith by a continuously rotating hold-down wheel. This system measures the average thickness of the coating over a length of strip during the time required for measurement and in a non-contacting manner.

Another system is disclosed in copending U.S. patent application Ser. No. 227,920, filed Jan. 23, 1981, entitled "Method and Apparatus for Measuring Coating Thicknesses on Continuously Moving Materials," now U.S. Pat. No. 4,383,172, which is commonly owned by the assignee of the present invention, and of which the present invention is an improvement.

SUMMARY OF THE INVENTION

The primary object of this invention is to provide a system for measuring the coating thickness of continuously moving strip material, including segmented strip material, wherein a measuring probe is selectively engaged with the continuously moving strip material at spaced points therealong, and remains engaged therewith for a preselected distance interval, which avoids the limitations imposed by the above-noted prior art examples, and which is capable of operating at high strip material speeds without altering either the speed or the direction of movement of the strip material.

In one aspect thereof, the measuring system of this invention is characterized by the provision of a reciprocating shuttle which initially is moved forwardly along the path of movement of the material to be measured at a speed less than the speed of the material, which is then engaged with the strip material for being moved thereby during the measuring stroke of the shuttle and disengaged therefrom during its return stroke, and which carries a measuring probe selectively adjustable for precise alignment with the areas to be measured and which is brought into operative contact therewith during the measuring stroke of the shuttle. The strip material is supported for measurement on a guide plate carried by the shuttle, and which can either be fixed in a predetermined position or selectively angularly positioned transversely of the strip material direction of movement to permit the measurement of coating thickness on both inclined surfaces of the strip material as well as on horizontal surfaces thereof.

The foregoing and other objects, advantages, and characterizing features will become apparent from the ensuing detailed description of certain illustrative embodiments thereof, taken in conjunction with the accompanying drawings wherein like reference numerals denote like parts throughout the various views.

DETAILED DESCRIPTION OF THE ILLUSTRATIVE EMBODIMENTS

Figure 1:
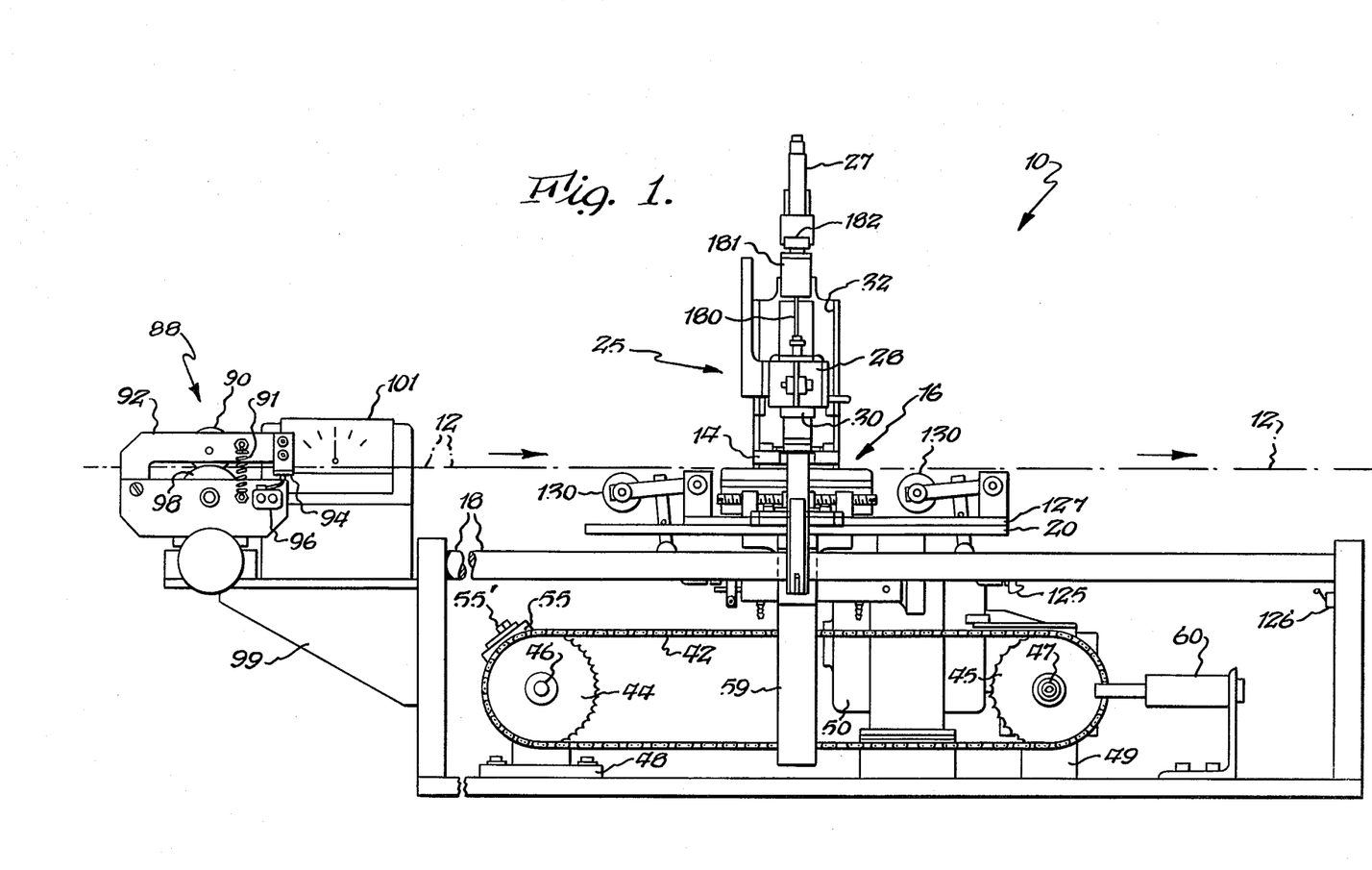
FIG. 1 is a front elevational view of an apparatus according to the present invention, the arrows indicating the direction of travel of the moving strip material.
Figure 2:
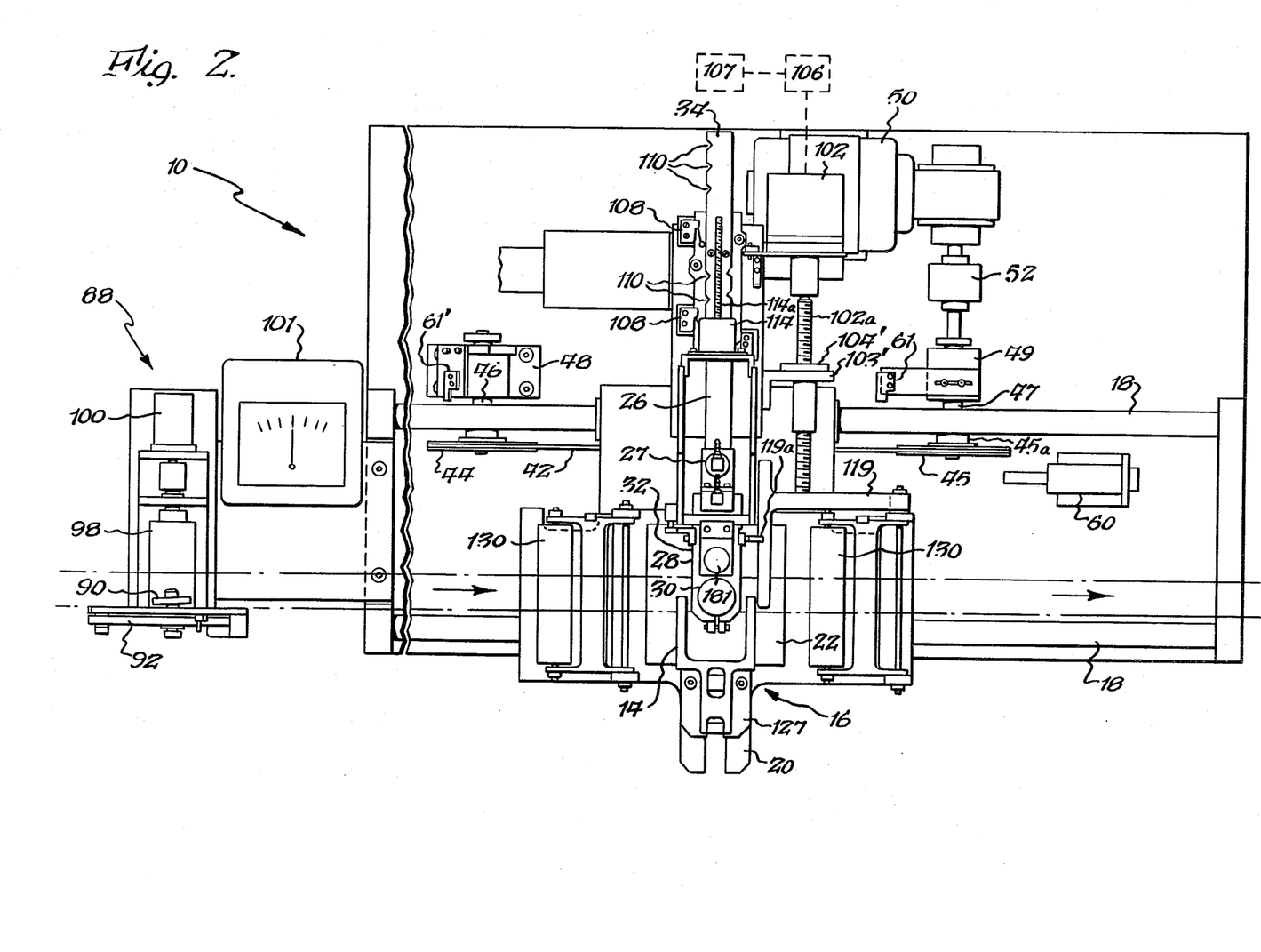
FIG. 2 is a plan view of the apparatus shown in FIG. 1.
Figures 3, 4, 5:
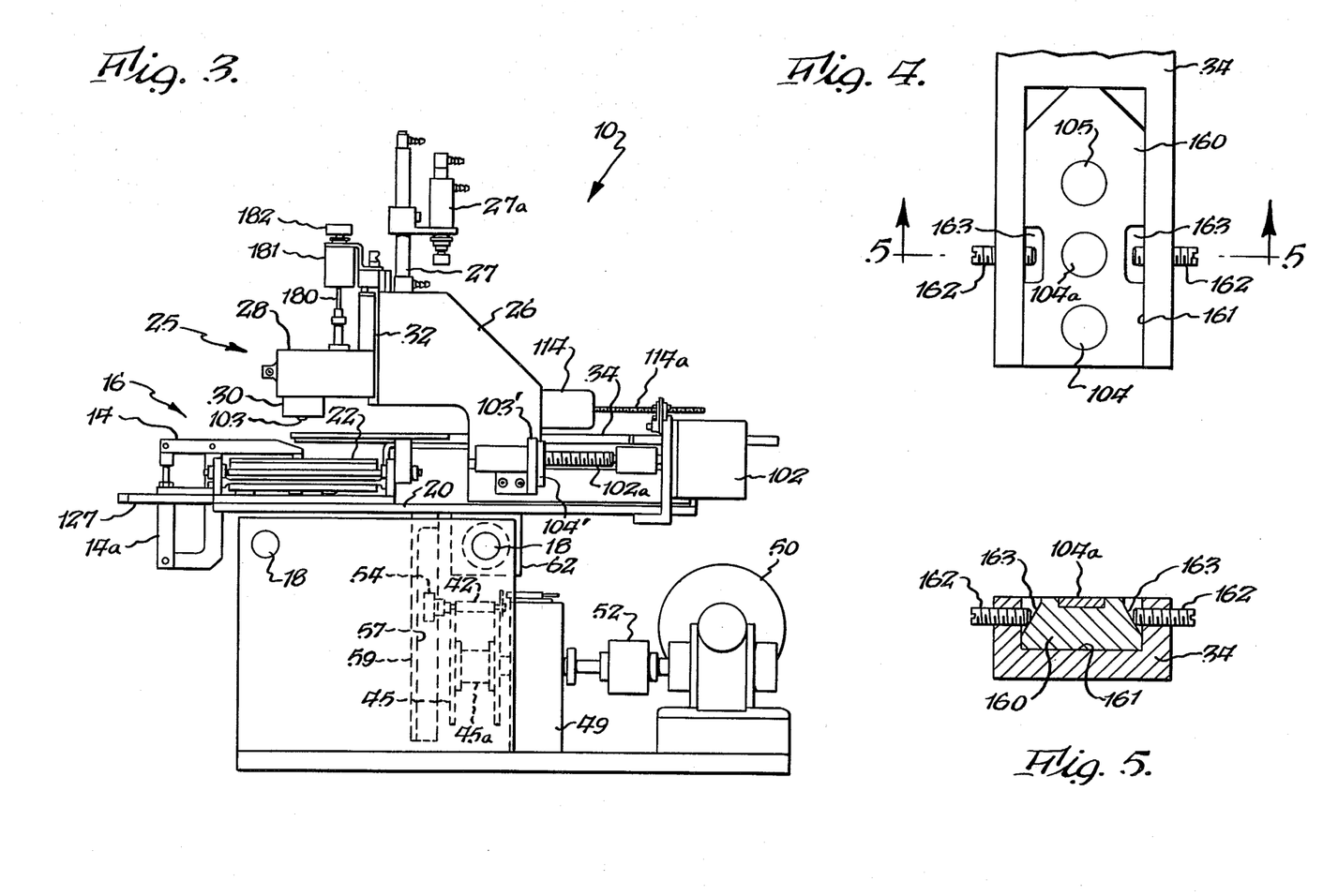
FIG. 3 is a right side view of the apparatus shown in FIG.1.
FIG. 4 is a fragmentary plan view of a calibration slide which carries calibration standards.
FIG. 5 is a cross-sectional view taken along the line 5—5 of FIG. 4.

There is shown in FIGS. 1, 2, and 3 the overall structure of one embodiment of apparatus generally designated 10 for measurement of coating thickness on a continuously moving strip 12. The coating can be of any desired material, such as, for example, gold, and it can be applied by any means, such as electrodeposition, vacuum deposition, autocatalytic deposition, or any other suitable coating deposition methods.

Apparatus 10 can be positioned anywhere along the path of travel of strip 12 and includes a reciprocating shuttle 16 slidably supported on and carried by a pair of spaced, parallel guide rails 18, which are disposed beneath strip 12 and parallel to the path of travel thereof. For measurement of an uninterrupted or non-segmented strip 12, shuttle 16 is intermittently secured to the strip by a hold-down clamp 14. For measurement of a segmented strip, or strips with indexing holes, locating devices such as pins or conforming or mating supports can be used, as will hereinafter be described in more detail.

Shuttle 16 includes a base plate 20 carrying a removable carriage plate 127 upon which is positioned a strip guide plate 22 for guiding and supporting strip 12 during measurement. Clamp 14, when employed, is also positioned on carriage plate 127.

A measuring head assembly 25 is carried on base plate 20 of shuttle 16 and includes a holder arm 26 carrying a mounting element 28 for removably positioning either a suitable optical aligning device, such as, for example, a microscope having a cross hair reticle (not shown) or another device for facilitating alignment of the axis of mounting element 28 with the area to be measured, or, alternatively, a measuring probe 30 containing a Geiger-Muller tube and radioactive isotope source (not shown). Both the aligning device and the measuring probe can be of any suitable types, the construction and operation of which are well known to those skilled in the coating measurement art and therefore require no further description. Holder arm 26 also includes a vertical guide-way 32 in which mounting element 28 is actuated vertically by a pneumatic cylinder 27 and pressure regulator 27a for vertical positioning of probe 30 relative to strip 12. Measuring head 25 also can include a transversely movable calibration slide 34 for automatic calibration of probe 30, as described in more detail hereinafter.

Shuttle 16 is reciprocated along guide rails 18 by a conventional endless chain drive arrangement. Chain 42 passes around sprockets 44, 45, which are mounted on shafts 46, 47, respectively, rotatably journaled in blocks 48, 49, respectively. Sprocket 45 is driven through one-way clutch 45a. A conventional drive motor 50 having a safety slip clutch 52 associated therewith drives shaft 47 and with it chain 42.

As shown in phantom in FIG. 3, chain 42 has a roller 54 carried thereby which is retained in a vertical guide slot 57 located in a guide bracket 59, which is attached at its upper end to base plate 20. As drive chain 52 moves, roller 54 pulls shuttle 16 through its reciprocatory cycle, shuttle 16 idling momentarily at the completion of its forward travel and also at the completion of its rearward travel while roller 54 travels vertically downward and vertically upward, respectively, within guide slot 57 to change the direction of travel of shuttle 16. However, the shuttle is preferably driven by chain 42 at a linear speed slightly less than the linear speed of the moving strip, and when strip 12 and shuttle 16 are engaged during forward travel of shuttle 16, clutch 45a permits moving strip 12 to override the endless chain drive arrangement and to pull shuttle 16 along with it and at the same speed. Instead of endless chain 42, a conventional V-belt or lug belt drive, or any other suitable drive means, can be used if desired.

Shuttle 16 is held in sliding engagement with rail 18 by conventional pillow or bearing blocks 62 and is guided in precise alignment with rails 18 by a guide roller assembly 56 depending from base plate 20 (see FIG. 8) and having a fixed roller 58 riding on one side of outer rail 18 and a laterally adjustable roller 60 engaging the other side of outer rail 18.

A strip guide plate 22 is positioned on carriage plate 127, which, in turn, is removably secured to base plate 20 of shuttle 16. Guide plate 22 can be adapted for use with a variety of particular shapes of strip 12. The upper surface of guide plate 22 can be configured to conform to the lower surface of any strip, whether segmented or unsegmented, in order to provide vertical support in the area to be measured. Guide plate 22 includes edge guides 137, (see FIG. 6), each of which is selectively adjustable transversely of the strip path to maintain any desired lateral spacing therebetween to thereby accommodate various widths of strips 12 in proper position for measurement as the strip passes over shuttle 16 on the way to a strip pulling mechanism (not shown). To this end, each of guides 137 has a slot 138 for receiving screws 139 for securing guides 137 in adjusted position on plate 22. Guides 137 are intended to guide the edges of the moving strip.

The strip contacting portion of hold down clamp 14, when employed with a continuous, uninterrupted strip, can include clamp pads (not shown) of resilient material to frictionally hold strip 12 without marring the surface thereof. As strip 12 travels across guide plate 22 between edge guides 137, guide plate 22, of shuttle 16, may be held engaged with strip 12 by clamping strip 12 between clamp 14 and the upper surface of guide plate 22 for movement of shuttle 16 by the faster moving strip 12, as will be hereinafter more fully described. Clamp 14 is actuated by pneumatic cylinder 14a, which is connected to a suitable air supply and control system (not shown). During meaurement, which occurs when strip 12 is drivingly engaged with shuttle 16, probe 30 contacts strip 12 within the area defined by the inner edges of strip guides 137.

Guide plate 22 preferably includes a drive pin 78, which extends upwardly from the uppermost surface of plate 22 and which is used with segmented, interrupted strips to engage a transverse edge surface thereof to permit shuttle 16 to be pulled along by strip 12, as will hereinafter be described. It will be noted one or more pins 78 can be employed, if desired, or a differently shaped guide member such as an elongated projection (not shown) can be used, depending upon the configuration of the strip and the desired area of contact between a transverse edge of a strip segment and the guide member.

In operation with a non-segmented, continuous strip 12, shuttle 16 has the appropriate guide members 137 adjusted transversely so that strip 12 travels between the associated edge guides 140. Any given point on a moving strip 12 first travels through a combination speed sensor/imperfection sensor station 88 shown in detail in FIGS. 1 and 2. At station 88 strip 12 travels between a spring loaded pressure roll wheel 90 mounted on a pivot arm 92 having a pressure foot 94 at one end thereof for actuating a microswitch 96. Pressure roll 90 is positioned immediately above a sensor barrel 98 of a conventional tachometer 100. Wheel 90 is held against strip 12 by spring 91, which biases wheel 90 against barrel 98, the wheel and barrel and associated parts being securely mounted on a suitable stand 99. Sensor barrel 98 is rotated by strip 12 and tachometer 100 emits a signal proportional to the linear speed of strip 12, which signal is transmitted to an associated speed control mechanism (not shown), which can be of a type known in the art and which adjusts the speed of drive motor 50 to maintain the linear speed of chain 42 and of shuttle 16 at a preselected level below that of moving strip 12. The control mechanism can be adjusted to establish the desired speed differential between strip 12 and motor 50, and thereafter operates automatically to maintain the selected differential. If desired, the linear speed of strip 12 can be displayed by means of meter 101, or the like.

Sensor wheel 90, in addition to biasing strip 12 against sensor barrel 98, also senses abnormal thickness in the strip 12 due to splices, staples, and other thickness abnormalities in the strip, and actuates switch 96 to provide a signal to prevent shuttle 16 from being clamped to or driven by strip 12 for a predetermined period after the imperfection has passed under sensor wheel 90, a period which can be one complete cycle of shuttle 16. This arrangement prevents damage to measuring probe 30 and avoids incorrect readings that could result should measuring probe 30 engage the strip in the area in which the staple, splice, or other thickness abnormality is located.

During normal operation, the endless chain drive arrangement moves shuttle 16 at a speed only slightly slower than that of strip 12 in order to accomplish a smooth engagement of shuttle 16 and strip 12, thus avoiding any sudden jerking motions which could impose excessive loads on the strip and which may cause damage thereto. It is for this reason that the speed of the endless chain drive arrangement is automatically adjusted by suitable means to compensate for changes in the speed of the strip 12 as sensed by tachometer 100.

Shuttle 16 moves back and forth continuously along a preselected portion of rails 18 as determined by the spacing between sprockets 44, 45 of the endless chain drive arrangement. Measurements are made only during the forward travel of shuttle 16, in the direction in which strip 12 is moving, and only when there has been no detection of any strip thickness abnormality by sensor wheel 90 and microswitch 96. The shaft of roller 54, which drives shuttle 16 through slot 57 in bracket 59, is mounted in a bracket 55 (see FIG. 1) attached to endless chain 42, the opposite end of bracket 55 carrying a metal strip 55' having a reflective surface thereon for actuating a combined light source and photocell 61 (see FIG. 2) before shuttle 16 reaches its forwardmost position of travel, at which time photocell 61 provides a signal to release shuttle 16 from strip 12. When strip 12 is segmented, release is effected by elevating rollers 130 to lift strip 12 free from drive pin 78. When strip 12 is continuous, clamp 14 is released to free strip 12 from engagement with plate 22. Clamp 14 can be so configured as to include a pair of arms as shown in FIG. 2 to provide two contact points between strip 12 and plate 22.

Combined light source and photocell 61' is provided on block 48 to sense the rearmost position of shuttle 16 relative to strip 12 and thereby provide a signal to lower measuring probe 30, the probe being lowered to bring its apertured platen 103 into contact with strip 12 when a measurement is to be made. Probe 30 is raised out of contact with strip 2 when the measurement is completed, which is indicated by photocell 61. It will be appreciated that other photocell arrangements can be used, and that sensors other than photoelectric cells could be substituted for the above-described arrangement. Platen 103 has a strip-engaging face suitably apertured to overlie only the area to be measured, and can be releasably secured to the lower end of probe 30 by any suitable retaining means, all in a manner well known to those skilled in the art.

A slight time delay between the engagement of strip 12 with shuttle 16 and the downward movement of probe 30 into contact with the strip is built into the apparatus to ensure that the shuttle 16 and strip 12 are engaged before probe 30 is brought into contact with the strip. Thus, a coating thickness measurement is only made during the time that shuttle 16 and probe 30 are engaged with strip 12. Shuttle 16 will continue to reciprocate without engaging strip 12 as long as sensor wheel 90 continues to indicate that there are imperfections in the strip. Measurements taken by probe 30 are relayed to an appropriate readout mechanism (not shown) which can analyze, store, display, or otherwise process the information, and which can be of a type known to those skilled in the art.

During the initial set-up of shuttle 16 with respect to strip 12, a fine adjustment mechanism comprising a stepping motor 102 which drives a zero backlash screw 102a is used to advance and retract mounting element 28 transversely of the strip path through a bracket 103' having a threaded collar 104' secured thereto. A microscope cross hair reticle or other alignment device (not shown) is first inserted into mounting element 28 and motor 102 is actuated for transversely lining up the vertical axis of the barrel of element 28 with the portion of strip 12 which is to be measured. In this way, precise alignment of probe 30 and the area to be measured on strip 12 is obtained. This position can be stored in the memory of a computer 106, or it can be utilized by a suitable control unit (not shown). The alignment device is then removed from the barrel of element 28 and the probe 30 is inserted, being then in proper alignment with the area to be measured on strip 12.

In the operation of the apparatus in conjunction with a segmented strip 12, it should be recognized that clamp 14 need not be used. A guide plate 22 arrangement having an appropriate drive, an alignment pin 78 or other arrangement, and lifting rollers 130, are substituted for the clamp and guide plate arrangement used with an unsegmented, continuous strip.

Preferably the upper surface of drive pin 78 is inclined so that during normal operation when strip 12 is lowered onto guide plate 22 by roller 130, a segment contacting the upper surface will slide over pin 78, peritting the next following segment to engage the pin. Other drive pin and alignment arrangements can be used, if desired.

Figure 6:
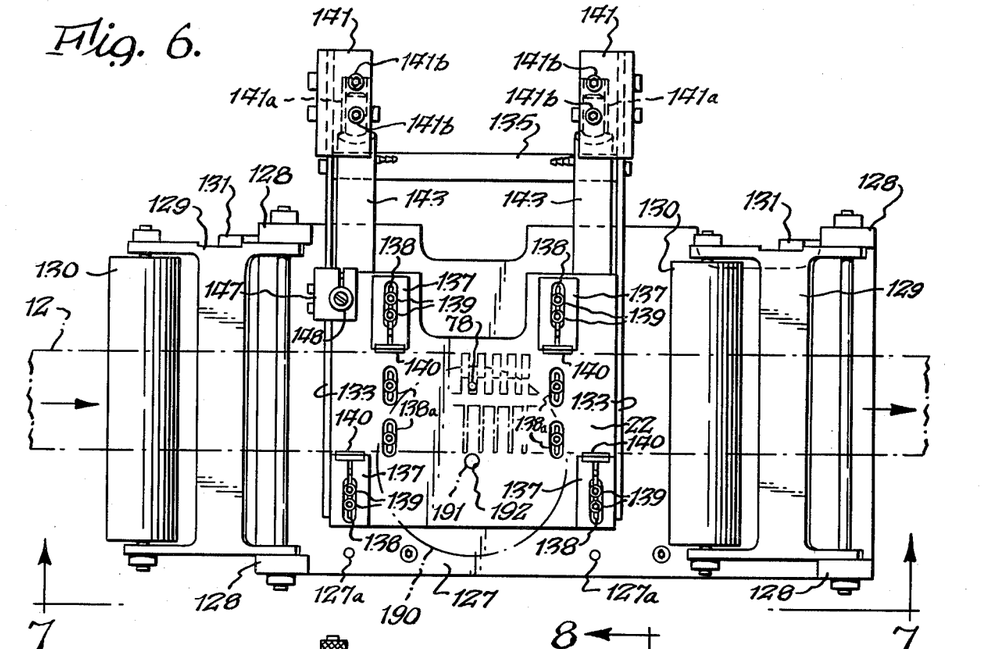
FIG. 6 is a plan view of a strip guide mechanism which can be used with a moving strip and is capable of being tilted about an axis generally parallel to the direction of strip movement for inclined coated surfaces.
Figure 7:
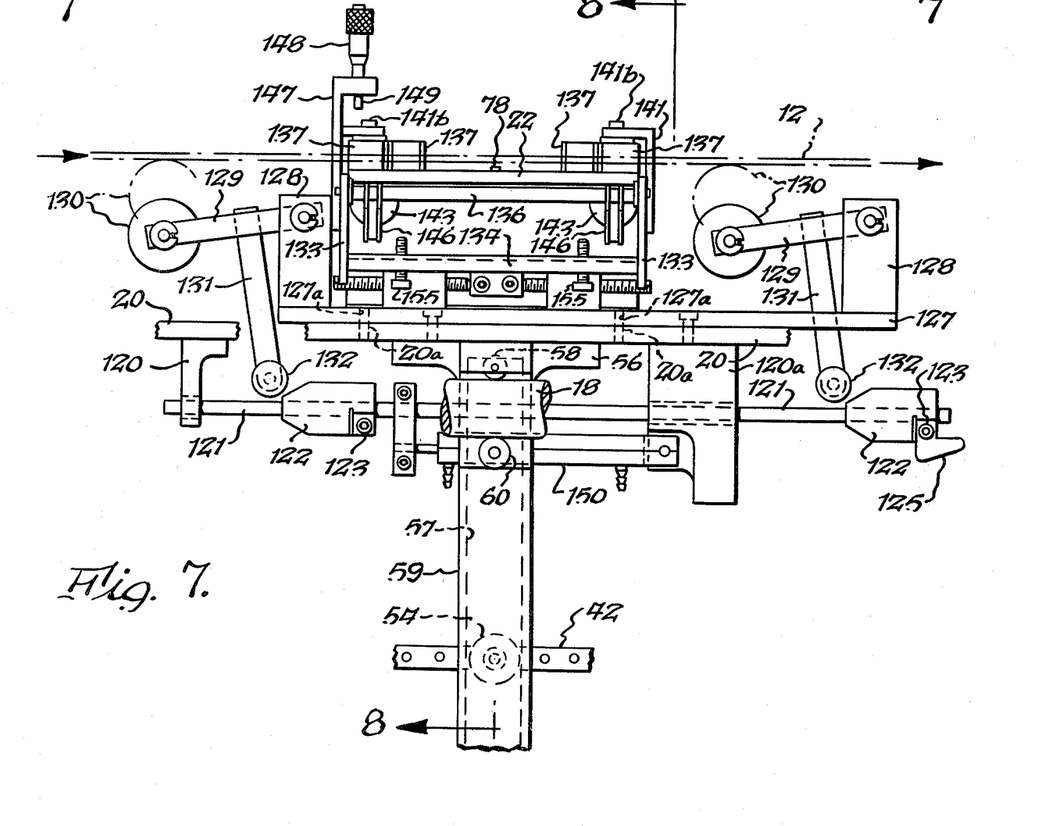
FIG. 7 is a front elevational view of the guide mechanism shown in FIG. 6 and taken along the line 7—7 thereof.
Figures 8, 9:
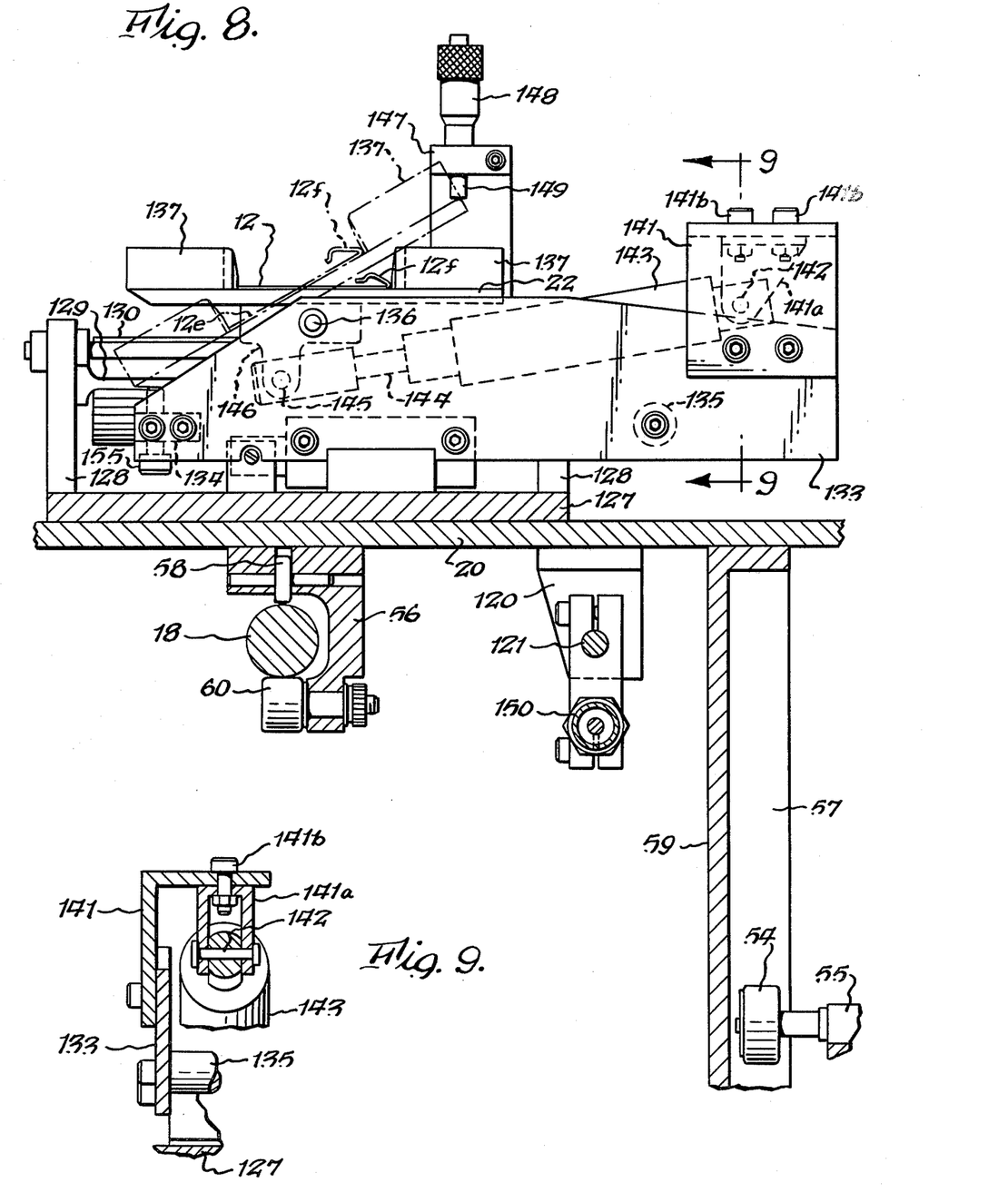
FIG. 8 is a cross-sectional view taken along the line 8—8 of FIG. 7.
FIG. 9 is a fragmentary cross-sectional view taken along the line 9—9 of FIG. 8.

The apparatus of the present invention can also be used to measure the thickness of a coating on a surface which is positioned at an angle with respect to the transverse measuring plane referred to in the description given hereinabove. In that connection, a tiltable strip guide plate 22, such as is illustrated in FIGS. 6–8, can be provided which is capable of being tilted from the horizontal position in order to position the strip so that the desired portion thereof can be properly oriented for coating thickness measurement. For example, if the strip is a series of electrical connector elements 12 configured such as those illustrated in FIGS. 6 and 8, the apparatus shown in FIGS. 6–8 can be utilized, which includes tiltable guide plate 22 which is adjustable about an axis generally parallel to the longitudinal axis of strip 12 to permit the major transverse dimension of strip 12 to be inclined at an angle to the horizontal, to thereby orient coated surface 12f so that it is in proper position for thickness measurement by means of probe 30.

Referring now to FIGS. 7 and 8, base plate 20 is slidably carried on rails 18 so that it may be shuttled alternately in the direction of strip travel and then in the opposite direction, in the manner heretofore described. The drive arrangement for this embodiment is the same as that shown in FIGS. 1–3, and includes an endless chain 55, which carries roller 54 which, in turn, is positioned in a generally vertically arranged guide slot 57 in shuttle drive arm 59 secured to and depending from baseplate 20.

Also depending from baseplate 20 is guide or roller assembly 56, which includes fixed roller 58 and adjustable roller 60, each of which is in rolling contact with rail 18 as shown in FIG. 8, and a pair of cam rod supports 120, 120a. Cam rod supports 120, 120a slidably support a cam rod 121 for movement along its axis, which is generally parallel to the direction of movement of strip 12. Positioned on cam rod 121 are a pair of spaced cam members 122, the relative position of each of which can be adjusted by means of a bolt 123, which is adapted to clamp cam members 122 to cam rod 121. Cam rod support 120a supports cam rod 121 as well as a cam surface 125, which is intended to contact forward limit switch 126 which is so positioned under rail 18 that contact is effected by cam surface 125 when shuttle 16 is at the forwardmost position, relative to strip 12, at the end of its path of travel.

Removably secured to baseplate 20 is a carriage plate 127, the method of securement being such that carriage plate 127 moves together with baseplate 20 as the latter is shuttled forward and rearward relative to strip 12 by the movement of roller 54 within vertical guide slot 57. Fixedly positioned on carriage plate 127 are a pair of spaced roller support yokes 128, to each of which a roller carrier yoke 129 is pivotally connected. Each carrier yoke 129 includes a carrier roll 130 positioned at the opposite end of roller carrier yoke 129 from the point at which it interconnects with roller support yoke 128. Depending from each roller carrier yoke 129 is a cam follower arm 131, at the lowermost end of each of which is positioned a cam roller 132, the latter being adapted to engage the surfaces of respective cam members 122 when the latter are moved in a leftward direction as shown in FIG. 73. Thus it can be seen that the movement of cam members 122 to the left as viewed in FIG. 73 serves to elevate the respective carrier rolls 130.

As best seen in FIGS. 6–8, a pair of spaced guide plate support members 133 is positioned on and secured to carriage plate 127 and maintained in parallel, spaced relationship by means of a front spacer rod 134 and a rear spacer rod 135. Pivotally connected to guide plate support members 133 is tiltable guide plate 22 which, as shown in FIG. 8, tilts about axis 136, which is substantially parallel to the longitudinal axis of strip 12. Positioned on the upper surface of guide plate 22 are two pairs of oppositely disposed edge guide members 137, each of which includes a generally centrally positioned elongated slot 138, slots 138 each having a recess to accommodate the head of a pair of bolts 139 for securing edge guide members 137 in a predetermined position and to permit adjustment of their position transversely of strip 12 in order to accomodate strips of different widths. If desired, rollers or other types of edge guides (not shown) could also be employed. Each of the inwardly directed faces of edge guides 137 adapted to contact strip 12 can, if desired, include pads 140, which can be formed from plastic materials, such as, for example, Teflon (a registered trademark of E. E. duPont deNemours Co.), or of a low friction ceramic material for longer wear, in order to facilitate sliding of the edges of strip 12 along the inwardly directed faces of edge guides 137 with a minimum of friction. Additionally, slots 138a are also provided in guide plate 22 to permit it to be adjusted in a direction transverse to the direction of movement of strip 12 by means of bolts 139a which are received in cooperating threaded holes in the guide plate pivot member.

As best seen in FIGS. 8 and 9, a support bracket 141 is secured to each of guide plate supports 133 and carries a pivot pin 142 for pivotally carrying one end of a guide plate actuating cylinder 143.

As shown in FIG. 9, each of guide plate actuating cylinders 143 is carried by a depending yoke 141a, which carries pivot pin 142 extending through one end of the cylinder, yoke 141a being secured to cylinder support bracket 141 by means of bolts 141b. Cylinders 143 also include a movable rod 144 (see FIG. 8) connected to a piston (not shown) within cylinder 143 and which can be moved by admitting pressurized air or hydraulic fluid to one of the sides of the piston. The outer ends of rods 144 carry a transversely positioned pivot pin 145 which is received in a bell crank arrangement 146 secured to the underside of guide plate 22. Preferably, two guide plate actuating cylinders 143 are provided, one on each side of guide plate 22 as shown in FIG. 8 in order to provide balanced actuating forces. However, if desired, only a single guide plate actuating cylinder 143 can be provided.

Secured to one of guide plate support members 133 and spaced laterally from tilt axis 136 is a micrometer support bracket 147, within which a micrometer 148 is positioned for perpendicular movement with respect to the plane of the major transverse dimension of strip 12. Micrometer 148 includes a movable rod 149, or any other suitable and adjustable movement limiting device to limit the angle of tilt of guide plate 22. The use of a micrometer facilitates accurate positioning of plate 22, and after positioning is effected a pair of stop screws 155, or the like, are so positioned to provide stop surfaces for plate 22, after which micrometer rod 149 is retracted so that it is not damaged.

The strip carrier and shuttle arrangement illustrated in FIGS. 6–8 is adapted to guide and receive a segmented strip. If the strip is flat, guide plate 22 would remain in a generally horizontal position in a plane parallel to the plane of the strip. However, if differently shaped connector members define the strip 12, such as that illustrated in FIG. 6, wherein the surface bearing the coating the thickness of which is to be measured is disposed at an angle to the major lateral dimension of the strip, it would normally be necessary to provide an inclined surface (not shown) on platen 103 of probe 30, with the angle of inclination being such as to permit proper positioning of the platen with the part. Such a platen 103 would be difficult to orient properly and the orientation would be very time consuming in terms of machine setup. Additionally, different angular platens would have to be provided to accommodate different contact surface inclinations. Thus the present invention permits guide plate 22 to be tilted to such a degree that the coating to be measured is presented in a substantially horizontal direction so that a flat apertured platen can be utilized for all measurements.

As shuttle 16 begins its forward travel in the direction of travel of strip 12, photocell 61' is activated by plate 55', thereby initiating a signal to actuate cylinder 150, lowering elevating rollers 130 to their down position as shown in solid lines in FIG. 7. The level of strip 12 as it approaches guide plate 22 is thus slightly beneath the upper surface of the guide plate. Strip 12 is under tension and seats itself on guide plate 22 by means of the first segment that engages drive pin 78. Shuttle 16 is then pulled forward by the strip as a result of the engagement of strip 12 and drive pin 78 with one-way clutch 45 permitting override of the endless chain drive arrangement so that shuttle 16 travels at the faster speed at which strip 12 is moving, i.e., synchronous with strip 12. A slight delay between the time when elevating rollers 130 drop to their down position and the time when probe 30 engages strip 12 is built into the apparatus to ensure that strip 12 and drive pin 78 are engaged before probe 30 engages strip 12. When shuttle 16 approaches the forward limit of its travel as sensed by photocell 61, cylinder 27 raises probe 30 and cylinder 150 actuates cam rod 121, thereby elevating rollers 130, which lifts strip 12 up and away from drive pin 78 and maintains this spaced relationship throughout the return cycle of shuttle 16. If desired, a dashpot 60 can be provided to engage arm 59 and thereby assist in slowing shuttle 16 as it reaches the forwardmost point of its path of travel.

Although motor 50 is controlled to drive shuttle 16 through its forward cycle at a speed slower than the speed of the moving strip, it will be appreciated that motor 50 and its control can be so arranged as to drive shuttle 16 at a much faster speed through the return portion of the cycle, thereby increasing the number of measurements which can be made during a given time period.

As shown in FIG. 2, carriage plate 127 also carries a stop bar 119, which is in underlying relationship to a stop pin 119a carried by mounting element 28. The purpose of this arrangement is to provide an interlock to limit vertical descent of probe 30 when both stop bar 119 and roller 130 are elevated, at which time strip 12 is not in proper position for measurement.

Calibration of probe 30 is performed when initially setting up for operation and can also be done automatically from time to time thereafter. The calibration is accomplished utilizing the automatic slide 34 as shown in FIGS. 2 and 3. Slide 34 is mounted in horizontal orientation in holder arm 26 for reciprocating movement permitting it to be individually advanced along a path that intersects at a point in space that is aligned with the apertured opening 103 of probe 30. As shown in FIGS. 4 and 5, slide 34 has standards 104, 104a, and 105 mounted at the forward end thereof, adjacent probe 30. Standard 104 is the base material of the strip, standard 104a is the coating material alone, and standard 105 is the base material plus the coating material in a known thickness. It is preferred that there be at least 3 standards for proper calibration, although additional standards can be provided, if desired. Limit switches 108 are mounted adjacent slide 34 for cooperation with suitably spaced notches 110 provided along one edge of slide 34 for selectively controlling the positioning of standards 104, 104a, and 105 in alignment with probe 30 as the slide is advanced by motor 114, through threaded shaft 114a and for limiting the retraction of the slide motor 114 once calibration has been completed. Probe 30 is lowered onto the standard after it has been properly positioned, and this can be accomplished automatically using switches 108. Slide 34 can also be used for automatic recalibration during normal measuring operation of apparatus 10 to make computer controlled periodic checks and recalibration if necessary after a preselected number of measurements. Because temperature, settlement of dust and dirt, isotope decay, and other factors affect the readings of the probe, this checking and recalibration is necessary to ensure measuring consistency and reliability. It should be noted that neither movement of the strip 12 nor movement of the shuttle 16 is interrupted during this automatic checking and recalibration procedure.

As shown in FIGS. 4 and 5, calibration standards 104 and 105 are positioned in a holder 160, which, in turn, is retained in a slot 161 in slide 34 by means of opposed, transverse set screws 162. Holder 160 includes inclined recesses 163 against which screws 162 bear, the inclination thereof causing holder 160 to be securely seated against the base of slot 161.

When it is desired to shift the position of probe 30 relative to strip 12 during operation, for example to take a sequence of measurements in one relative transverse position followed by a sequence of measurements in another relative transverse position, stepping motor 102 can be operated to rotate threaded rod 102a to automatically, periodically reposition probe 30 under control of a suitably programmed computer 106, as indicated in FIG. 2. Computer 106 can be part of a readout mechanism 107, and, if desired, can control other functions of the apparatus.

In the operation of the tilting plate configuration illustrated in FIGS. 6–9, the shuttle arrangement would operate as heretofore described, rollers 130 initially being in elevated position to space strip 12 from the surface of tiltable guide plate 22. When guide plate 22 has completed its return travel and is to begin traveling in the same direction as that of strip 12, cam rod actuator cylinder 150 is actuated to cause cam rod 121 to move to the right as shown in FIG. 7, whereupon rollers 130 will fall below the plane of movement of strip 12 by virtue of their weight and will permit an interior edge of intermittent strip 12 to engage with drive pin 78 extending upwardly from the upper surface of guide plate 22. Once the moving strip has securely contacted drive pin 78 to cause guide plate 22 to move at the same speed as strip 12, guide plate actuating cylinders 143 are actuated to cause guide plate 22 to tilt to the position shown in phantom in FIG. 8, whereupon surface 12f to be measured is correctly oriented to permit a measurement to be made by causing probe 30 to descend sufficiently to bring platen 103 into contact with surface 12f. The angular movement of guide plate 22 is limited by the position of screws 155, which are vertically adjustable to limit the vertical movement of the adjacent end of plate 22 and thereby change the angle to which guide plate 22 is permitted to tilt.

Probe 30 is operated in the same fashion as has hereinbefore been described, and after the measurement has been made probe 30 retracts, whereupon guide plate actuating cylinder 143 is again actuated, this time to cause guide plate 22 to return to a horizontal position.

Thereupon, cam rod actuator cylinder 150 is actuated to cause cam rod 121 to move to the left as shown in FIG. 7, thereby causing cam members 122 to contact cam rollers 132 so that each of carrier rolls 130 moves upward against the underside of strip 12, and elevates it above the uppermost surface of guide plate 22, thereby removing strip 12 from engagement with drive pin 78. At that point the shuttle is approaching the end of its path of travel in a downstream direction, to thereafter return in a direction opposite to that in which strip 12 is moving in order to engage another portion of strip 12 and permit another measurement in the same fashion, to thereby provide a substantially continuous monitoring of the thickness of the coating applied to the surface which is being measured.

As shown in FIGS. 1, 2, and 3, mounting element 28 is also connected to shaft 180, which extends into a dashpot 181 comprising a piston and cylinder arrangement having an adjustable needle valve 182 to control the rate of air flow into and out of the dashpot. The dashpot serves to slow the descent of and thereby soften the impact of platen 30 against strip 12 to avoid damage to the strip from excessive impact forces which would otherwise occur since cylinder 27 is basically an on-off, two position device and is more difficult to modulate than is the dashpot arrangement shown.

As shown in FIGS. 6 and 7, carriage plate 127 can be accurately positioned on baseplate 20 by means of locating pins 20a extending upwardly from baseplate 20 and cooperating locating apertures 127a which extend upwardly through carriage plate 127. As would be apparent to those skilled in the art, the locating pins can, instead, be carried by the carriage plate and the cooperating locating apertures can be positioned in the baseplate, if desired. In any event, pins 20a and apertures 127a permit the removal of carriage plate 127 and the substitution of another carriage plate having a different guide plate especially adapted for a specific strip configuration. Thereafter, when the strip configuration for which carriage plate 127 as shown is desired to be measured in accordance with the present invention and is intended to be repositioned on the apparatus, the cooperating pin and aperture arrangement just described facilitates the rapid and accurate repositioning of guide plate 22 relative to baseplate 20, and also relative to measuring probe 30. Thus a series of carriage plates can be provided, each provided with a guide plate adapted for use with a particular strip configuration in order to simplify changeover of the apparatus.

In instances where the strip comprises spaced, interconnected semiconductor contacts having a coated surface which is subject to deflection under load, similar to surface 12f shown in FIG. 8, a backup member 190 can be provided to support the end of the contact and limit deflection thereof during the time a measurement is being made. Backup member 190 can be in the form of a wheel, as shown, and which includes a stub shaft 191 which is rotatably and axially slidably received in an aperture 192 in guide plate 22. The peripheral portion of backup member 190 can be so configured as to fit under and thereby support the end of the contact during measurement. When the shuttle is being driven by strip 12, backup member 190 is stationary; when the shuttle is being independently driven and there is relative motion between guide plate 22 and strip 12, backup member 190 can rotate in order to minimize frictional drag on strip 12. Additionally, when rollers 130 elevate strip 12 from guide plate 22, backup member 190 also moves with strip 12 away from guide plate 22 while stub shaft 191 slides axially outwardly with respect to aperture 192. Stub shaft 191 is of sufficient length to permit it to be rotatably supported in aperture 192 throughout its anticipated axial movement in the operation of the apparatus of the present invention.

It can be seen from the foregoing discussion and the accompanying drawings that the apparatus of the present invention places no limitations on the speed at which the moving strip travels. The path of the strip need not be altered to conform to the configuration of the measuring apparatus, as in one of the prior art devices, and since probe 30 is engaged with strip 12 during the measuring cycle, a more accurate measurement can be made than if the probe were spaced from the strip. The pass length of the shuttle is designed to provide maximum measurement accuracy within the available space.

It is believed that the invention and its advantages will be fully understood from the foregoing description and it will be apparent that the embodiments described herein are intended to be illustrative only and not limiting as to the invention, the scope of which is intended to be defined in the following claims.

What is claimed is:

1. In an apparatus for measuring coating thickness on strip material moving along a predetermined path, the apparatus including a shuttle carrying a measuring probe having coating thickness sensing means and carrying a supporting surface for supporting the strip material during the time the thickness measurement is being made, drive means for reciprocating the shuttle along a preselected segment of the path traveled by the strip material, means for selectively engaging and disengaging the supporting surface and the moving strip so that the shuttle is driven by the strip for synchronous movement therewith during engagement thereof and is driven independently of the strip during disengagement thereof, and means for operatively coupling and uncoupling the probe and the moving strip while the shuttle and the strip are engaged, the improvement comprising said supporting surface positioned for angular inclination relative to the plane in which the major transverse surface of said strip lies and about an axis substantially parallel to the longitudinal axis of the strip, and means for selectively inclining said surface a predetermined amount while said strip is in driving contact with said supporting surface to properly position for measurement that portion of the coated area desired to be measured.

2. The apparatus of claim 1 wherein the axis of inclination of said supporting surface underlies said strip.

3. The apparatus of claim 1 wherein said engaging and disengaging means comprises at least one elevating roller carried by said shuttle and in underlying relationship with said strip, said roller being supported for movement toward and away from said strip to selectively raise and lower said strip relative to said supporting surface.

4. The apparatus of claim 3 wherein said shuttle carries cam means to raise and lower said roller.

5. The apparatus of claim 1 wherein said shuttle includes means to limit the angular inclination of said supporting surface.

6. The apparatus of claim 5 wherein said inclination limiting means is adjustable.

7. The apparatus of claim 6 wherein said limiting means includes micrometer means for permitting accurate, repeatable limit settings.

8. The apparatus of claim 1 wherein said supporting surface includes at least one drive pin positioned for engagement with an edge of said strip material for driving said shuttle in synchronous engagement with said strip.

9. The apparatus of claim 8 wherein said supporting surface includes edge guide means positioned thereon and extending upwardly therefrom for guiding said strip and positioning it relative to said drive pin to permit an edge thereof to contact said drive pin in driving engagement.

10. The apparatus of claim 9 wherein said edge guide means are adjustable in a direction transverse to the direction of travel of said strip, whereby to permit said supporting surface to receive strips having different widths.

11. The apparatus of claim 1 wherein said inclining means includes at least one fluid operated cylinder having one end thereof pivotally connected to said shuttle and the other end thereof pivotally connected to said supporting surface, and means for introducing pressurized fluid to said cylinder to position said supporting surface.

12. The apparatus of claim 1 wherein said supporting surface is positioned on a carriage plate removably secured to said shuttle, said carriage plate and said shuttle each having cooperable positioning means to permit accurate and repeatable repositioning of said carriage plate on said shuttle after removal therefrom.

* * * * *